US008802795B2

(12) United States Patent
Meier et al.

(10) Patent No.: US 8,802,795 B2
(45) Date of Patent: Aug. 12, 2014

(54) PROCESS FOR THE PREPARATION OF A POLYOLEFIN POLYMER WITH IMPROVED WAX DEPOSITION

(75) Inventors: Gerhardus Meier, Frankfurt (DE); Reinhard Kuehl, Bronheim (DE); Harald Prang, Erfstadt (DE); Michael Aulbach, Swisttal-Heimerzheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/818,845

(22) PCT Filed: Aug. 30, 2011

(86) PCT No.: PCT/EP2011/064847
§ 371 (c)(1),
(2), (4) Date: Feb. 25, 2013

(87) PCT Pub. No.: WO2012/028591
PCT Pub. Date: Mar. 8, 2012

(65) Prior Publication Data
US 2013/0158213 A1    Jun. 20, 2013

Related U.S. Application Data

(60) Provisional application No. 61/404,519, filed on Oct. 5, 2010.

(30) Foreign Application Priority Data

Aug. 31, 2010   (EP) ...................................... 10009056

(51) Int. Cl.
*C08F 2/12*    (2006.01)
*C08F 6/24*    (2006.01)
*C08F 210/08*  (2006.01)

(52) U.S. Cl.
USPC ...... 526/65; 526/348.6; 528/501; 528/502 D; 528/503

(58) Field of Classification Search
USPC .............. 526/65, 348.6; 528/501, 502 D, 503
See application file for complete search history.

(56) References Cited

U.S. PATENT DOCUMENTS 5,207,929 A * 5/1993 Sung et al. ..................... 210/774
6,204,344 B1  3/2001 Kendrick et al.
6,204,345 B1  3/2001 Berthold et al.

OTHER PUBLICATIONS

PCT International Search Report & Written Opinion mailed Nov. 15, 2011, for PCT/EP2011/064847.

*Primary Examiner* — Fred M Teskin

(57) ABSTRACT

Process for the preparation of a polyolefin polymer by continuously polymerizing one or more olefin monomers in suspension at temperatures of from 40° C. to 120° C. and pressures of from 0.1 to 10 MPa in the presence of a polymerization catalyst in at least one polymerization reactor, comprising a) withdrawing a suspension of solid polyolefin particles in a suspension medium from the polymerization reactor, wherein the suspension has a temperature of from 65° C. to 120° C.; b) feeding the suspension withdrawn from the polymerization reactor to a moderating vessel; c) keeping the suspension in the moderating vessel at a temperature of from 60° C. to 85° C. for a time sufficiently long that the mean residence time of the suspension in the moderating vessel is at least 5 min; d) withdrawing suspension from the moderating vessel; e) cooling the suspension withdrawn from the moderating vessel to a temperature of from 20° C. to 55° C.; and f) mechanically separating the solid polyolefin particles from the liquid suspension medium, and method for controlling the content of hydrocarbons with from 14 to 300 carbon atoms in a polyolefin polymer prepared by polymerizing one or more olefin monomers in suspension.

10 Claims, 1 Drawing Sheet

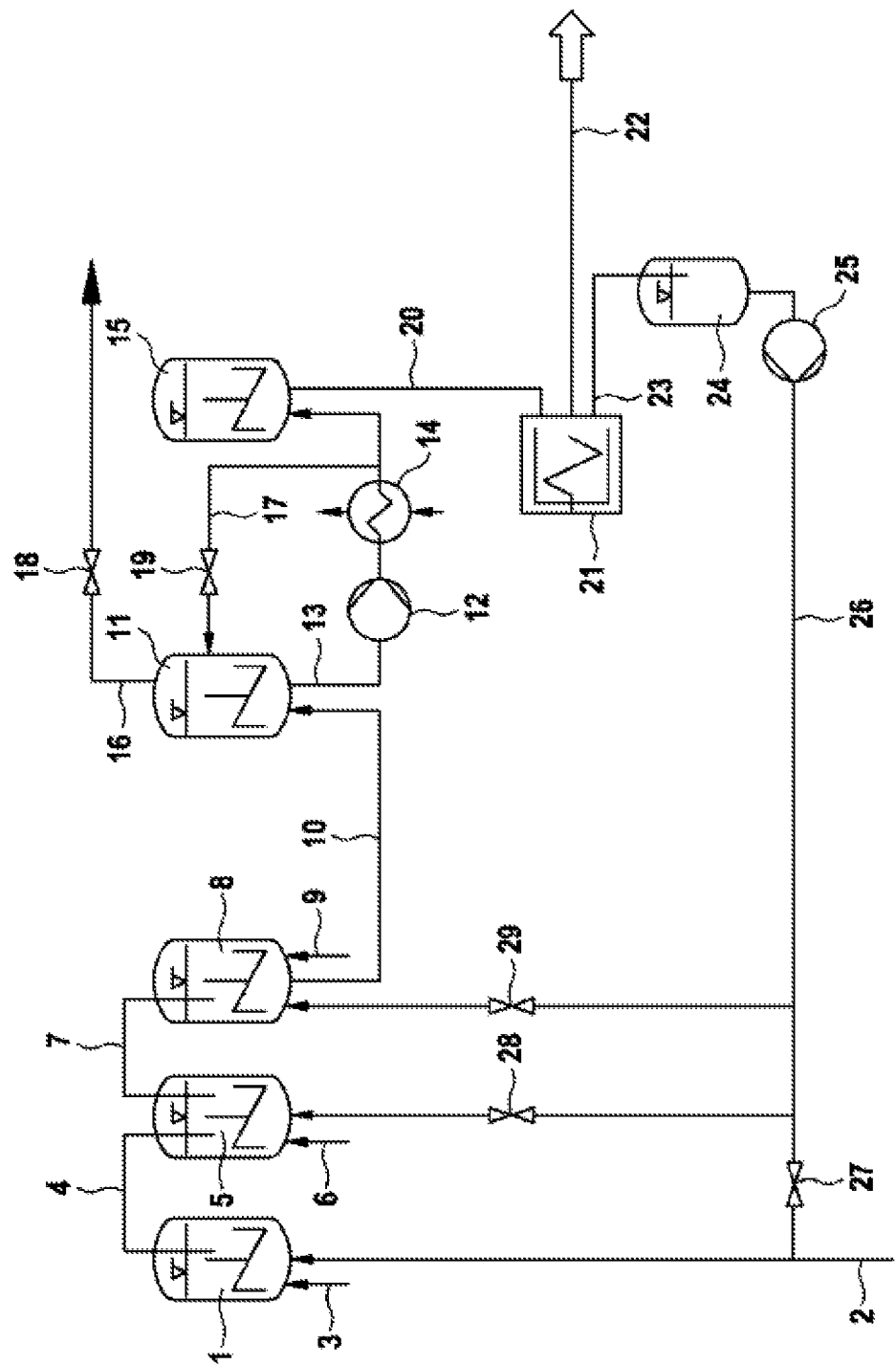

PROCESS FOR THE PREPARATION OF A POLYOLEFIN POLYMER WITH IMPROVED WAX DEPOSITION

This application is the U.S. National Phase of PCT International Application PCT/EP2011/064847, filed Aug. 30, 2011, claiming priority of European Patent Application No. 10009056.2, filed Aug. 31, 2010 and the benefit under 35 U.S.C. 119(e) of U.S. Provisional Application No. 61/404,519, filed Oct. 5, 2010, the contents of which are incorporated herein by reference in their entirety.

BACKGROUND

The present invention relates to a process for the preparation of a polyolefin polymer by polymerizing one or more olefin monomers in suspension in the presence of a polymerization catalyst in least one polymerization reactor and a method for controlling the content of hydrocarbons with from 14 to 300 carbon atoms in a polyolefin polymer prepared by polymerizing one or more olefin monomers in suspension.

Suspension polymerization processes in which olefin monomers are polymerized in a liquid medium are well known in the art. The obtained polyolefin polymers are commercially successfully used in a multitude of applications. It is general knowledge that polymerization processes do not produce polymers with uniform molecular weight but with a molecular weight distribution. Accordingly, also suspension polymerization processes produce polymer chains of different length including low-molecular-weight constituents. Such constituents with chain lengths of from 14 to 300 carbon atoms are often designated as oligomers or waxes. While in gas-phase polymerization processes the produced low-molecular-weight polymer chains remain within the growing polymer particles, the low-molecular-weight constituents need special attention in suspension polymerization processes because these constituents are at least at elevated temperatures partially soluble in the suspension medium. This is especially required if a suspension medium is used which is not easily recyclable by vaporization and subsequent condensation.

There exist suspension polymerization processes in which, subsequent to the polymerization, the liquid phase is separated from the polymer particles by vaporizing substantially all of the monomers and the diluent. WO 99/47251 describes for example such a separation process which is carried out in a series of two flash tanks. It is however also common in suspension polymerization processes that the polymer is mechanically removed from the suspension medium after the polymerization reaction, for example by a centrifuge. For cost savings the separated suspension medium, or at least a part of it, is either as such returned to the polymerization reaction or after regeneration, for example by distillation, during which the dissolved low-molecular-weight constituents appear as a paste-like to solid residue which has to be disposed of. Accordingly, it is advantageous if the suspension medium comprises after the separation from the polymer particles as little as possible of waxy components. Moreover, for some applications it can be advantageous for the product properties if as much as possible low-molecular-weight constituents are comprised in the polymer. Consequently, there have been efforts to increase in suspension polymerization processes the portion of low-molecular-weight components which remain with the polymer particles and to reduce the amount of waxy components which have to be disposed of.

EP 0 905 152 A1 describes a process for preparing ethylene copolymers in suspension in which the suspension stream is partly evaporated before removing the suspension medium from the polymer particles, with the result that some of the wax formed in the polymerization is adsorbed onto the polymer particles. However, evaporating a substantial part of the suspension medium uses a high amount of energy and requires introducing reduced pressure to a production plant, which might give rise to safety issues.

SUMMARY

Thus, it was the object of the present invention to overcome the disadvantages of the prior art and to find a way for operating a suspension polymerization process in a manner that a high portion of the produced low-molecular-weight constituents is removed from the suspension medium together with the polymer particles. Furthermore, it should be possible to adjust the quantity of removed low-molecular-weight constituents to be able to vary the final product properties.

We have found that this object is achieved by a process for the preparation of a polyolefin polymer by continuously polymerizing one or more olefin monomers in suspension at temperatures of from 40° C. to 120° C. and pressures of from 0.1 to 10 MPa in the presence of a polymerization catalyst in at least one polymerization reactor, comprising
a) withdrawing a suspension of solid polyolefin particles in a suspension medium from the polymerization reactor, wherein the suspension has a temperature of from 65° C. to 120° C.;
b) feeding the suspension withdrawn from the polymerization reactor to a moderating vessel;
c) keeping the suspension in the moderating vessel at a temperature of from 60° C. to 85° C. for a time sufficiently long that the mean residence time of the suspension in the moderating vessel is at least 5 min;
d) withdrawing suspension from the moderating vessel;
e) cooling the suspension withdrawn from the moderating vessel to a temperature of from 20° C. to 55° C.; and
f) mechanically separating the solid polyolefin particles from the liquid suspension medium.

Furthermore, we have found a method for controlling the content of hydrocarbons with from 14 to 300 carbon atoms in a polyolefin polymer prepared by polymerizing one or more olefin monomers in suspension.

BRIEF DESCRIPTION OF THE DRAWINGS

The features and advantages of the present invention can be better understood via the following description and the accompanying drawing which shows schematically a preferred set-up for carrying out the process of the present invention. In particular, the drawing shows a scheme for a preferred set-up for preparing a polyolefin polymer in suspension according to the process of the present invention in which the polymerization takes place in a cascade of three reactors.

DETAILED DESCRIPTION

The present invention provides a process for the preparation of polyolefin polymers. These polyolefin polymers can be homopolymers or copolymers of olefins and of 1-olefins, i.e. hydrocarbons having terminal double bonds, without being restricted thereto. Preferred monomers are nonpolar olefinic compounds, including aryl-substituted 1-olefins. Particularly preferred 1-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various 1-olefins. Suitable olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is further possible to polymerize mixtures of two or more olefins.

The process can be used in particular for the homopolymerization or copolymerization of ethylene or propylene. As comonomers in ethylene polymerization, preference is given to using up to 40 wt.-% of $C_3$-$C_8$-1-alkenes, in particular 1-butene, 1-pentene, 1-hexene and/or 1-octene. Preferred comonomers in propylene polymerization are up to 40 wt.-% of ethylene and/or 1-butene. Particular preference is given to a process in which ethylene is copolymerized with up to 20 wt.-% of 1-hexene and/or 1-butene.

The polymerization of the present invention is carried out in suspension. That means, the polymerization takes place in a medium, the so-called suspension medium, which is in liquid or in supercritical state under the conditions in the respective polymerization reactor and in which the produced polyolefin is insoluble and forms solid particles. The solids content of the suspension is generally in the range of from 10 to 80 wt.-%, preferably in the range of from 20 to 40 wt.-%.

The suspension medium, which forms the liquid or supercritical phase of the suspension, commonly comprises as main component a diluent but also comprises further components like, for example, solved monomers or comonomers, solved cocatalysts or scavengers like aluminum alkyls, solved reaction auxiliaries like hydrogen or solved reaction products of the polymerization reaction like oligomers or waxes. Suitable diluents should be inert, i.e. should not decompose under reaction conditions. Such diluents are for example hydrocarbons having from 3 to 12 carbon atoms, and in particular saturated hydrocarbons like isobutane, butane, propane, isopentane, pentane, hexane or octane, or a mixture of these. It is also possible to use unsaturated hydrocarbons such as monomers themselves like propylene as diluent. The process of the present invention is especially advantageous if diluents are used which are not easily recyclable by vaporization and subsequent condensation. Such diluents are for example hydrocarbons having a boiling point above 40° C. or even above 60° C. or mixtures comprising a high proportion of these hydrocarbons. Thus, the process of the present invention is especially advantageous if the polymerization takes place in a liquid suspension medium comprising more than 50 wt.-% of saturated hydrocarbons having a boiling point of above 60° C. at 0.1 MPa or even comprising more than 80 wt.-% of saturated hydrocarbons having a boiling point of above 60° C. at 0.1 MPa.

The process can be carried out using all industrially known suspension polymerization processes at temperatures in the range from 40 to 120° C., preferably from 50 to 100° C. and particularly preferably from 60 to 90° C., and under pressures of from 0.1 to 10 MPa and particularly preferably from 0.2 to 5 MPa. Processes of this type are generally known to those skilled in the art.

The polymerization can be carried out using all customary olefin polymerization catalysts. That means, the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are of the Ziegler type preferably comprising a compound of titanium or vanadium, a compound of magnesium and optionally a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$ $Ti(O\text{-}i\text{-}C_3H_7)Cl_3$, $Ti(O\text{-}n\text{-}C_4H_9)C_{13}$, $Ti(OC_2H_5)Br_3$, $Ti(O\text{-}n\text{-}C_4H_9)Br_3$, $Ti(OCH_3)_2Cl_2$, $Ti(OC_2H_5)_2C_{12}$, $Ti(O\text{-}n\text{-}C_4H_9)_2C_{12}$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ or $Ti(O\text{-}n\text{-}C_4H_9)_4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides and in particular the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine and in particular chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides, $SiCl_4$ or $CCl_4$ and preferably chlorine or hydrogen chloride.

Examples of suitable, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the $di(C_1-C_{10}-alkyl)$ magnesium compounds. Preferably, the Ziegler-Natta catalyst comprises a transition metal selected from titanium, zirconium, vanadium, chromium.

Catalysts of the Ziegler type are usually polymerized in the presence of a cocatalyst. Preferred cocatalysts are organometallic compounds of metals of groups 1, 2, 12, 13 or 14 of the Periodic Table of Elements, in particular organometallic compounds of metals of group 13 and especially organoaluminum compounds. Preferred cocatalysts are for example organometallic alkyls, organometallic alkoxides, or organometallic halides.

Preferred organometallic compounds comprise lithium alkyls, magnesium or zinc alkyls, magnesium alkyl halides, aluminum alkyls, silicon alkyls, silicon alkoxides and silicon alkyl halides. More preferably, the organometallic compounds comprise aluminum alkyls and magnesium alkyls. Still more preferably, the organometallic compounds comprise aluminum alkyls, preferably trialkylaluminum compounds. Preferably, the aluminum alkyls comprise, for example, trimethylaluminum, triethylaluminum, tri-isobutylaluminum, tri-n-hexylaluminum and the like.

The preparation of the polyolefin polymers is carried out in at least one polymerization reactor. Preferably the polymerization is carried out in a cascade of at least two polymerization reactors which are connected in series. These reactors are not restricted to any specific design; preferably these reactors are however loop reactors or stirred tank reactors. There is no limit to the number of reactors of such a cascade, however preferably the cascade consist of two, three or four reactors and most preferably of two or three reactors. If a cascade of polymerization reactors is used in the process of the present invention the polymerization conditions in the polymerization reactors can differ, for example by the nature and/or the amount of comonomers or by different concentrations of polymerization auxiliaries such as hydrogen. In such cases it is possible to prepare polyolefin polymers composed of components of different composition, which are commonly called multimodal or bimodal polyolefin polymers, where the term "multimodal" however often also includes "bimodal".

The process of the present invention comprises the step of continuously withdrawing a suspension of solid polyolefin particles in a suspension medium from a polymerization reactor. This polymerization reactor can be a single polymerization reactor. Preferably, the reactor is the last polymerization reactor of a series of reactors. The suspension withdrawn from the polymerization reactor has a temperature of from 65° C. to 120° C., preferably from 65° C. to 90° C. and especially preferred from 70° C. to 85° C.

The suspension withdrawn from the polymerization reactor is fed to a moderating vessel. This moderating vessel differs from a polymerization reactor in that no additional monomer or comonomer is added to the reactor. The purpose of the moderating vessel is to keep the suspension for a certain time at a certain temperature. Such a moderating vessel is usually a stirred container with continuous feed and continuous drain. According to the present invention the temperature of the suspension in the moderating vessel is so adjusted that it is in the range of from 60° C. to 85° C., preferably from 60° C. to 80° C. and especially preferred from 60° C. to 75° C. Feed, drain and volume of the moderating vessel are further arranged in a way that the mean residence time of the suspension in the moderating vessel is at least 5 min, preferably from 5 min to 60 min and especially preferred from 10 min to 30 min.

The suspension continuously withdrawn from the moderating vessel is then cooled to a temperature in the range of from 20° C. to 55° C. and preferably from 30° C. to 50° C. This cooling is usually achieved by passing the suspension through a heat exchanger, preferably a jacketed pipe. The cooled suspension is thereafter mechanically separated in solid polyolefin particles and liquid suspension medium. The separation can be carried out in all suitable separation apparatuses such as a centrifuge or a filtering system. Preferably the apparatus for separating the solid polyolefin particles and liquid suspension medium is a centrifuge.

The transfer of the suspension from the polymerization reactor or the last polymerization reactor of the cascade of polymerization reactors to the moderating vessel is regularly carried out utilizing the pressure difference between the pressure in the polymerization reactor or the last polymerization reactor of the cascade of polymerization reactors and the pressure in the moderating vessel. For withdrawing the suspension from the moderating vessel it is however common to employ a pump, preferably a centrifugal pump.

Furthermore, the moderating vessel is usually operated at a lower temperature than the temperature in the polymerization reactor or the last polymerization reactor of the cascade of polymerization reactors. Accordingly, the heat carried by the suspension coming from the polymerization reactor or the last polymerization reactor of the cascade of polymerization reactors and the heat of the after-polymerization, which takes place in the moderating vessel, have partly to be removed. This heat removal can either take place by cooling the moderating vessel by a cooling jacked attached to the moderating vessel or by an external cooling circle for the suspension in the moderating vessel; the heat removal can take place by vaporizing a part of the liquid suspension medium in the moderating vessel; or the heat removal can take place by returning a part of the suspension, which is cooled in the cooling step downstream of the moderating vessel, to the moderating vessel. In preferred embodiments of the present invention the heat removal is carried out by returning a part of the suspension, which is cooled in the cooling step downstream of the moderating vessel, to the moderating vessel; by vaporizing a part of the liquid suspension medium in the moderating vessel, or by both returning a part of the suspension, which is cooled in the cooling step downstream of the moderating vessel, to the moderating vessel and vaporizing a part of the liquid suspension medium in the moderating vessel. In some embodiments, the moderating vessel is operated at a pressure of from 0.101 MPa to 1.0 MPa. For all these preferred embodiments an additional cooling by a cooling jacket or an external cooling circle can occur.

In a preferred embodiment of the present invention the suspension withdrawn from the moderating vessel is, after cooling in step e), not directly fed to the apparatus for mechanically separating the suspension in solid polyolefin particles and liquid suspension medium but to a collecting vessel, in which the suspension is preferably kept at a temperature in the range of from 20° C. to 55° C. and especially preferred from 30° C. to 50° C. The mean residence of the suspension in this collecting vessel is preferably at least 5 min and especially preferred from 5 min to 60 min.

The process of the present invention allows reducing the amount of waxy component in the liquid suspension medium. The finally obtained content of waxy components in the liquid suspension medium and the degree of the reduction depend however strongly on the produced products. The more comonomer is used and the broader the molecular weight distribution of the prepared polyolefin is the more hydrocarbons with from 14 to 300 carbon atoms are solved in the suspension medium withdrawn from the last polymerization reactor. Preferably the liquid suspension medium separated from the polyolefin particles in step f) comprises less than 3 wt.-% of solved waxy components and more preferably comprises less than 1 wt.-% of solved waxy components where the content of waxy components is determined by passing the suspension medium at a temperature of 60° C. through a filter; evaporating the liquid by heating till 120° C. at 40 kPa for 30 min, and weighting the residue.

The liquid suspension medium separated from the polyolefin particles in step f) is suited to be recycled directly to the polymerization process. Thus, according to a preferred embodiment of the present invention the liquid suspension medium separated from the polyolefin particles in step f) is fed to one or more of the polymerization reactors, in which the polyolefin polymer is prepared.

By selecting an adequate temperature and an adequate mean residence time in the moderating vessel it is possible to extensively reducing the amount of waxy components in the suspension medium and deposit it on the solid polyolefin particles. By choosing different temperatures of the suspension in the moderating vessel and/or a different mean residence times less hydrocarbons with from 14 to 300 carbon atoms are deposited on the solid polyolefin particles and accordingly a higher content of solved waxy components in the suspension medium is observed. Furthermore, the characteristics of the process also depend on the structure of the produced polyolefin. In general however, a shorter mean residence time in the moderating vessel results in a higher content of solved waxy components in the suspension medium. With respect to the temperature in the moderation vessel, as well a too high temperature as a too low temperature may effect higher amounts of solved waxy components in the suspension medium and consequently lower amounts of such hydrocarbons with from 14 to 300 carbon atoms in the polyolefin polymer. Thus, the variations of the temperature of the suspension in the moderating vessel and/or of the mean residence time offer possibilities to easily modify the content of waxy components, i.e. of hydrocarbons with from 14 to 300 carbon, in the polyolefin polymer.

The present invention accordingly also provides a method for controlling the content of hydrocarbons with from 14 to 300 carbon atoms in a polyolefin polymer prepared by continuously polymerizing one or more olefin monomers in suspension at temperatures of from 40° C. to 120° C. and pressures of from 0.1 to 10 MPa in the presence of a polymerization catalyst in at least one polymerization reactor, comprising a) withdrawing a suspension of solid polyolefin particles in a suspension medium from the polymerization reactor, wherein the suspension has a temperature of from 65° C. to 120° C.;
b) feeding the suspension withdrawn from the polymerization reactor to a moderating vessel;
c) withdrawing suspension from the moderating vessel;
d) cooling the suspension withdrawn from the moderating vessel to a temperature of from 20° C. to 55° C.; and
e) mechanically separating the solid polyolefin particles from the liquid suspension medium, wherein the content of hydrocarbons with from 14 to 300 carbon atoms in the polyolefin polymer is controlled by setting the temperature of the suspension in the moderating vessel and/or the mean residence time of the suspension in the moderating vessel to predefined values.

There are various possibilities for carrying out the process of the present invention.

The drawing shows a scheme for a preferred set-up for preparing a polyolefin polymer in suspension according to the process of the present invention in which the polymerization takes place in a cascade of three reactors.

The diluent for polymerizing the olefins in the first polymerization reactor (1) in suspension is fed to the reactor via feeding line (2) while the other components of the reaction mixture like catalyst, monomer, possible comonomers and polymerization auxiliaries are fed to the reactor via one or more feeding lines (3). As result of the polymerization in reactor (1) a suspension of solid polyolefin particle in a suspension medium is formed. This suspension is fed via line (4) to the second polymerization reactor (5) where further polymerization occurs. Fresh comonomer or further components of the reaction mixture can be fed to reactor (5) via one or more feeding lines (6). The suspension of reactor (5) is thereafter fed via line (7) to the third polymerization reactor (8) in which additional polymerization is carried out. One or more feeding lines (9) allow supplementary feeding of comonomer or further components of the reaction mixture to reactor (8).

The suspension of solid polyolefin particle in the suspension medium formed in reactor (8) is continuously transferred via line (10) to moderating vessel (11), which is operated in a way that the mean residence time is about 20 min. The content of moderating vessel (11) is withdrawn by means of pump (12) via line (13), passed through heat exchanger (14) and transferred to collecting vessel (15). For cooling the suspension in moderating vessel (11), which is required since on the one hand suspension of a higher temperature is continuously added through line (10) and on the other hand to remove the heat of the after-polymerization, which takes place in moderating vessel (11), it is possible to evaporate a part of the suspension medium and remove the generated gas via line (16) and to return a part of the suspension cooled in heat exchanger (14) via line (17) back to moderating vessel (11). To regulate the cooling or to suppress one or both of them, lines (16) and (17) are equipped with valves (18) and (19).

The suspension is then passed via line (20) to centrifuge (21), where the solid polyolefin particles are separated from the liquid suspension medium. The isolated polyolefin particles, which after removal of the liquid suspension medium still have from 10 to 30 wt.-% of residual moisture, i.e. of residual suspension medium, are conducted via line (22) to a dryer (not shown) and thereafter to a pelletizing unit (not shown).

The isolated suspension medium is transferred via line (23) to a further collecting vessel (24) and from there by means of pump (25) via line (26) to polymerization reactors (1), (5) and/or (8). For controlling and regulating the transfer of the suspension medium to reactors (1), (5) and/or (8), line (26) and its branch-offs are equipped with valves (27), (28) and (29).

The process of the present invention makes it possible in an easily workable way to deposit in a controlled matter a high proportion of the produced low-molecular-weight constituents of the obtained polyolefin polymers on the solid polymer particles and remove them from the suspension medium.

The invention is illustrated below with the aid of an example, without being restricted thereto.

EXAMPLE 1

Ethylene was polymerized in a continuous process in three reactors arranged in series. A Ziegler catalyst component prepared as specified in WO 91/18934, Example 2 and having there the operative number 2.2 was fed into the first reactor in an amount of 13.5 mmol/h with respect to the titanium content of the catalysts compound, together with 174 mmol/h of triethylaluminum, as well as sufficient amounts of hexane as diluent, ethylene, and hydrogen. The amount of ethylene (=67.2 kg/h) and the amount of hydrogen (=74 g/h) were adjusted so that the percentage proportion of ethylene and of hydrogen measured in the gas space of the first reactor were from 20 to 23% by volume and 66 to 71% by volume, respectively, and the rest was a mix of nitrogen and vaporized diluent.

The polymerization in the first reactor was carried out at 84° C.

The suspension from the first reactor was then transferred into a second reactor, in which the percentage proportion of hydrogen in the gas phase had been reduced to 16 to 20% by volume, and an amount of 120 g/h of 1-butene was added to this reactor alongside with 46.8 kg/h of ethylene. The amount of hydrogen was reduced by way of intermediate $H_2$ depressurization. 65 to 70% by volume of ethylene, 16 to 20% by volume of hydrogen, and 0.15 to 0.20% by volume of 1-butene were measured in the gas phase of the second reactor, the rest being a mix of nitrogen and vaporized diluent.

The polymerization in the second reactor was carried out at 84° C.

The suspension from the second reactor was transferred to the third reactor using further intermediate $H_2$ depressurization to adjust the amount of hydrogen to 2.0% by volume in the gas space of the third reactor.

An amount of 540 g/h of 1-butene was added to the third reactor alongside with an amount of 32.1 kg/h of ethylene. A percentage proportion of 81 to 84% by volume of ethylene, 1.9 to 2.3% by volume of hydrogen, and 1.2% by volume of 1-butene was measured in the gas phase of the third reactor, the rest being a mix of nitrogen and vaporized diluent.

The polymerization in the third reactor was carried out at a pressure of 0.4 MPa at 85° C. The suspension from the third reactor was transferred to a moderating vessel operated at a pressure of 0.13 MPa, which was cooled by a cooling jacket and by vaporizing a part of the liquid suspension medium. The suspension in the moderating vessel had a temperature of 65° C. and its mean residence time was 20 min. The suspension was withdrawn from the moderating vessel by means of a pump and transferred through a heat exchanger to a collecting vessel, which acted as feeding container for the centrifuge. By passing the heat exchanger the suspension was cooled to a temperature of 35° C. The suspension in the collecting vessel had a temperature of 35° C. and its mean residence time in this vessel was 30 min. Thereafter the suspension was transferred to a centrifuge, where suspension medium and polymer particles were separated.

The liquid suspension medium leaving the centrifuge had a content of solved waxy components of 0.2 wt.-%. The content of solved waxy components was determined by taking a sample of about 100 g from the suspension medium; passing the sample at a temperature of 60° C. through a filter; evaporating the liquid by heating till 120° C. at 40 kPa for 30 min, and weighting the residue.

The liquid suspension medium separated from the polymer particles was fed back to the second and the third reactor of the cascade.

COMPARATIVE EXAMPLE A

Example 1 was repeated, however the mean residence time in the moderating vessel reduced to 4 min.

The liquid suspension medium leaving the centrifuge had a content of solved waxy components of 1.2 wt.-%.

The comparison of Comparative Example A and Example 1 shows that by operating the moderating vessel with a longer mean residence time it is possible to reduce the content of solved waxy components in the suspension medium significantly.

The invention claimed is:

1. A process for the preparation of a polyolefin polymer by continuously polymerizing one or more olefin monomers in suspension at temperatures of from 40° C. to 120° C. and pressures of from 0.1 to 10 MPa in the presence of a polymerization catalyst in at least one polymerization reactor, comprising
   a) withdrawing a suspension of solid polyolefin particles in a suspension medium from the polymerization reactor, wherein the suspension has a temperature of from 65° C. to 120° C.;
   b) feeding the suspension withdrawn from the polymerization reactor to a moderating vessel;
   c) keeping the suspension in the moderating vessel at a temperature of from 60° C. to 85° C. for a time sufficiently long that the mean residence time of the suspension in the moderating vessel is at least 5 min;
   d) withdrawing suspension from the moderating vessel;
   e) cooling the suspension withdrawn from the moderating vessel to a temperature of from 20° C. to 55° C.; and
   f) mechanically separating the solid polyolefin particles from the liquid suspension medium
   wherein the suspension in the moderating vessel is cooled by returning a part of the suspension cooled in step e) to the moderating vessel.

2. A process according to claim 1, wherein the polymerization reactor from which the suspension is withdrawn in step a) is the last polymerization reactor of a series of polymerization reactors.

3. A process according to claim 1, wherein the moderating vessel is operated at a pressure of from 0.101 MPa to 1.0 MPa.

4. A process according to claim 1, wherein the suspension in the moderating vessel is cooled by vaporizing a part of the liquid suspension medium in the moderating vessel.

5. A process according to claim 1, wherein the suspension is fed after cooling step e) to a collecting vessel.

6. A process according to claim 5, wherein the suspension is kept in the collecting vessel at a temperature of from 20° C. to 55° C. sufficiently long that the mean residence time of the suspension in the collecting vessel is at least 5 min.

7. A process according to claim 1, wherein the separation of solid polyolefin particles from the liquid suspension medium takes place in a centrifuge.

8. A process according to claim 1, wherein the liquid suspension medium separated from the polyolefin particles in step f) comprises less than 3 wt.-% of solved waxy components, which content is determined by passing the suspension medium at a temperature of 60° C. through a filter, evaporating the liquid by heating till 120° C. at 40 kPa for 30 min, and weighting the residue.

9. A process according to claim 1, wherein the liquid suspension medium separated from the polyolefin particles in step f) is fed to one or more of the polymerization reactors, in which the polyolefin polymer is prepared.

10. A method for controlling the content of hydrocarbons with from 14 to 300 carbon atoms in a polyolefin polymer prepared by continuously polymerizing one or more olefin monomers in suspension at temperatures of from 40° C. to 120° C. and pressures of from 0.1 to 10 MPa in the presence of a polymerization catalyst in at least one polymerization reactor, comprising a) withdrawing a suspension of solid polyolefin particles in a suspension medium from the polymerization reactor, wherein the suspension has a temperature of from 65° C. to 120° C.;
   b) feeding the suspension withdrawn from the polymerization reactor to a moderating vessel;
   c) withdrawing suspension from the moderating vessel;
   d) cooling the suspension withdrawn from the moderating vessel to a temperature of from 20° C. to 55° C.; and
   e) mechanically separating the solid polyolefin particles from the liquid suspension medium,
   wherein the content of hydrocarbons with from 14 to 300 carbon atoms in the polyolefin polymer is controlled by setting the temperature of the suspension in the moderating vessel and/or the mean residence time of the suspension in the moderating vessel to predefined values.

* * * * *